United States Patent [19]
Schnell

[11] 4,143,780
[45] Mar. 13, 1979

[54] LIFTING DEVICE FOR FEEDING A PROCESSING MACHINE

[76] Inventor: Karl Schnell, Mühlstr. 28, D-7065 Winterbach, Fed. Rep. of Germany

[21] Appl. No.: 776,871

[22] Filed: Mar. 11, 1977

[51] Int. Cl.[2] .......... B65G 65/04
[52] U.S. Cl. .......... 414/620; 414/648
[58] Field of Search .......... 214/302, 303, 313, 315, 214/707, 142, 674

[56] References Cited

U.S. PATENT DOCUMENTS

| | | | |
|---|---|---|---|
| 1,763,560 | 6/1930 | Amendolara | 214/707 |
| 1,906,000 | 4/1933 | Finlay et al. | 214/142 |
| 2,808,947 | 10/1957 | Shippy | 214/302 |
| 2,926,803 | 3/1960 | Collins | 214/313 |
| 3,375,947 | 4/1968 | Kissilov | 214/674 |
| 3,499,564 | 3/1970 | Hopfeld | 214/707 |

*Primary Examiner*—Lawrence J. Oresky
*Attorney, Agent, or Firm*—McGlew and Tuttle

[57] ABSTRACT

A lifting device, particularly for feeding a processing machine in the food industry, comprises a telescopic post which includes a plurality of telescopically extensible and retractable parts and a container support which is pivoted to the post. The container support includes a supporting arm which is shifted between a support position in which the arm extends substantially horizontally to support the material and a discharge position at which it is tilted by the movement of the telescopic parts relative to each other.

7 Claims, 4 Drawing Figures

LIFTING DEVICE FOR FEEDING A PROCESSING MACHINE

FIELD AND BACKGROUND OF THE INVENTION

This invention relates in general to the construction of lifting devices for conveying systems and, in particular, to a new and useful device for lifting containers of materials, particularly foodstuffs, for feeding a processing machine.

DESCRIPTION OF THE PRIOR ART

The present invention relates in particular to a lifting device for feeding a processing machine, particularly in the food industry. The apparatus includes a structure for supporting a preferably portable container for receiving the material to be processed, with the supporting structure being displaceable along a post and pivotable about a horizontal axis. Such lifting devices are known per se and employed, for example, in connection with butcher machines. The material to be processed in the example mentioned, e.g., meat, or perhaps further ingredients, is thus transported to the processing machine in a container. For this reason, it is advantageous to provide portable containers. The containers are lifted to the level of the filling opening of the processing machine, particularly of a filling funnel, by means of the lifting device. Lifting devices of the prior art are designed so that the containers can be pivoted, at least in its uppermost position at the end of the lifting stroke, about a horizontal axis and thus tilted to drop its contents into the funnel or filling opening of the processing machine. The supporting structure, along with the container, are pivoted back and then lowered again upon emptying.

A disadvantage with these lifting devices of the prior art is that the post is relatively high, particularly for high processing machines and large containers, which makes the displacement of the processing machine from one location to the other difficult. It is sometimes necessary to dismount the post in order to transport the machine, with the result that it takes a considerable amount of time to put the machine into operation again.

SUMMARY OF THE INVENTION

The present invention is directed to a lifting device for feeding a processing machine having the same height of lift as the comparable devices of the prior art, but having a smaller overall constructional height, so that no disassembly is necessary for the transportation or displacement of the associated processing machine.

A lifting device in accordance with the invention includes a telescopic lifting post and a pivoting mechanism for the material which is controlled by the lifting motion of the post. During reception of the container, the telescopic post remains in its retracted position in which it does not project above the processing machine or projects only to a small extent so that it does not disturb the transportation of the materials and the containers therefor. The design of the post as a telescoping post ensures that the container can be lifted to the level needed for discharging the contents of the container into the processing machine. A particular advantage is that the mechanism for pivoting the container can be controlled by the lifting motion of the post. This means that in the same manner as in conventional lifting devices, the container initially remains in its horizontal position and is tilted only upon reaching a definite height of lift. Advantageously, the control is designed so as to tilt the container into the discharging position, only after the telescopic post is largely or completely extended. In addition, the control of the tilting operation by the lifting motion of the post has the advantage that a premature rotating or discharging of the container is prevented.

A development of the invention provides that the support is mounted on the uppermost telescoping member and has the form, particularly, of the letter U, with both U-legs extending, in the lowered position of the support, substantially horizontally and with a pivot shaft extending axially through the middle portion or web of the support. Usually, the containers which are handled have rectangular cross-sections and are engaged by the support from three sides and locked in position. Once the container is locked, the telescopic post can be extended and the operational steps may be secured relative to each other by providing that the hydraulic power cylinder effecting the lift can be pressurized only after the container is completely locked to the support. It may be understood from the foregoing that the telescopic post is arranged at one side of the U-shaped support for the container. Therefore, it is easily possible to provide another telescopic post at the opposite side of the support, if necessary, in view of the admissible weight of the filled container. This second post may be designed in the same manner as the first one, but it is also possible to provide the pivoting mechanism for the container and the control thereof on only one of the telescopic posts.

According to a further development of the invention, the leg of the support adjacent the post of the support is provided with a control extension comprising a guide groove or the like, which cooperates with a guide member of a lower, preferably the next lower, telescoping member. This guide groove extends obliquely relative to the leg and forms therewith, an obtuse angle of, preferably, about 120°. Advantageously, the gate end of the guide groove which receives the guide member is provided on one or both sides with an oblique lead-in face, in order to facilitate the entry of the guide member which is preferably designed as a bolt. Due to the oblique extension of groove walls, upon a further lift of the support with the container, the guide member penetrating into the guide groove causes a rotary motion of the interlocked unit comprising the support and the container. At the same time, the lower groove wall bears from below against the guide member which, with the continuing tilting motion of the support, moves along the guide groove. As soon as the guide groove reaches its horizontal position, upon further tilting of the support, the motion of the guide member in the guide groove is reversed. In accordance with another feature of the invention, the central longitudinal axis of the groove passes through the pivotal axis of the support.

In a particularly preferred embodiment of the invention, the support is pivotable beyond a dead center position, against the action of at least one return spring. This makes it possible to tilt the container through more than 90° and, consequently, to ensure a complete emptying of the container. Then, upon depressurizing of the lifting power cylinder of the telescopic post, the return spring causes the support, with the container, to pivot back, and as soon as the dead center position is passed, the support, along with the movable parts of the telescopic post, can move downwardly, under their own weight, into their initial positions. It will be easily understood that this simple design makes it possible to manage without a double-acting hydraulic or pneumatic power cylinder.

In another variant of the invention, an abutting member is mounted on the uppermost telescoping member, which is shiftable in the lifting direction of the telescope, against the action of the return spring, and which cooperates with a stop provided on the next lower telescoping member. In the highest lifting position of the uppermost telescoping member, the tension of the spring is at its maximum. The spring must be dimensioned and adjusted so as to enable the container with its still full content to pivot from its emptying position back into its initial position merely by the tension of the spring. This may be necessary in cases, for example, where the container, along with its contents, has been stored in a freezer space, and the ice produced causes the contents to stick to the container. As far as a bias of the spring is provided even in the lowered position of the telescopic post, a stop must be provided for the abutting member, absorbing this spring tension.

According to a still further development of the invention, the abutting member is designed as a bolt and the return spring as a helical compression spring concentrically surrounding the bolt and resting, by its lower end, against the uppermost telescoping member and, by its upper end, against a collor of the bolt. This design has the advantage of a particularly narrow structure which can be well accommodated in a post.

Accordingly, it is an object of the invention to provide a lifting device in which a support for a container is mounted on a part of a telescopic post and the support is tilted during the upward and downward movement of the post by cam means which are defined between the post and the support.

A further object of the invention is to provide a lifting device for feeding a processing machine, which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawings and descriptive matter in which there is illustrated a preferred embodiment of the invention.

DESCRIPTION OF THE PREFERRED EMBODIMENT

Figure 1:
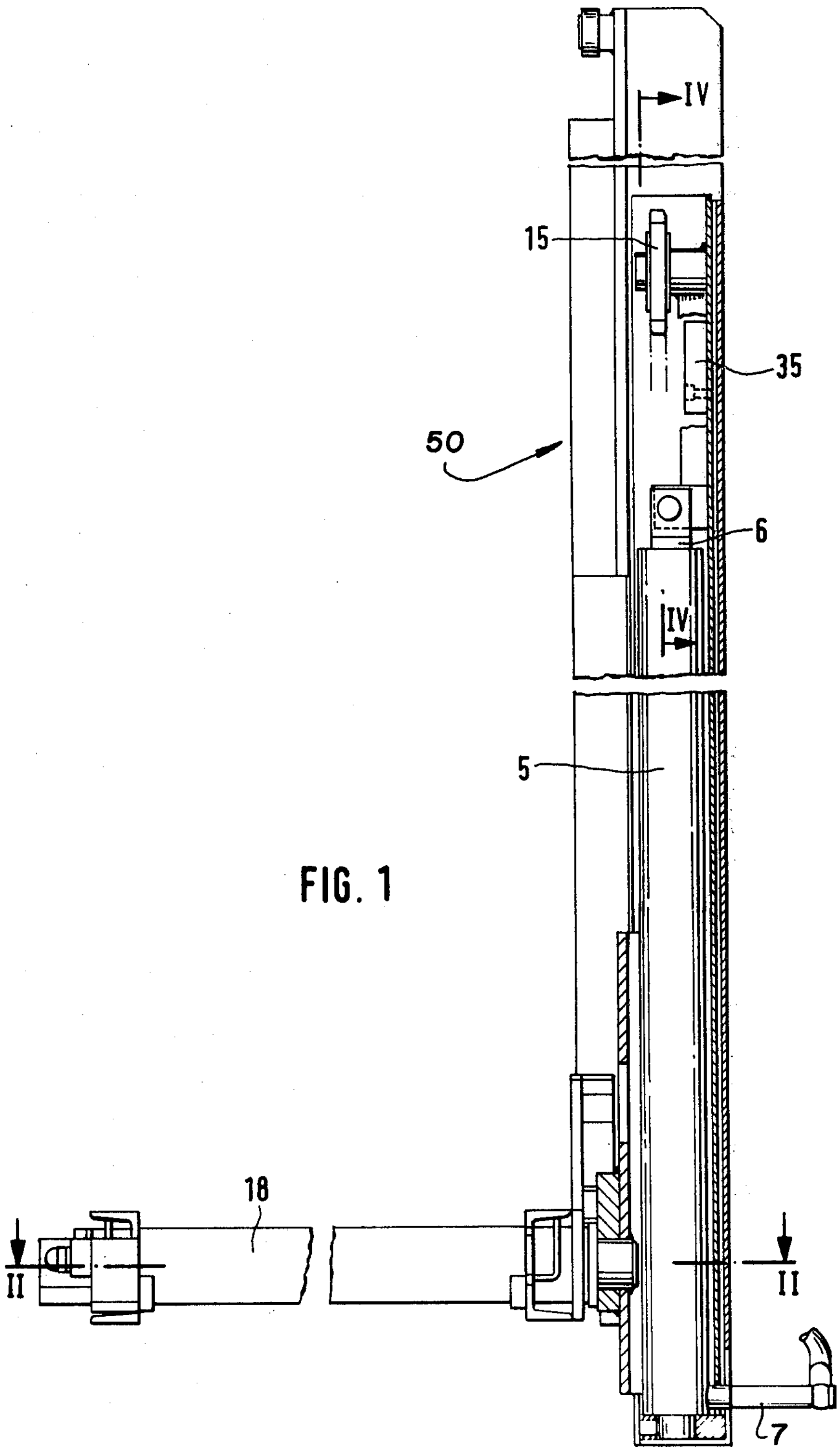
FIG. 1 is a vertical sectional view of a lifting device constructed in accordance with the invention.

Referring to the drawings in particular, the invention embodied therein, comprises a lifting device, particularly for feeding a processing machine in the food industry. In the embodiment shown, a lifting device, generally designated 50, serves the purpose of lifting containers, particularly portable containers, and is preferably employed in the meat industry. With the aid of this device, the material to be processed, i.e., meat or the like, is lifted to the level of a filling funnel of a respective processing machine (not shown). The device may be permanently fixed to the processing machine and transported therewith from one location to the other.

The lifting device 50 includes a telescopic post 1, and a support or supporting structure 3 is displaceable along the telescopic post and pivotable about a shaft 2 which forms a horizontal axis for the structure 3 and is intended to support and retain a container (not shown) in which the material to be processed is received. The device further comprises a pivoting mechanism, generally designated 4 in FIG. 3, by means of which the container in the upper lifting position or in the zone of the upper lifting position can be tilted. In accordance with another feature of the invention, this pivoting mechanism 4 is controllable by the lifting motion of the post. The lifting motion is produced by a hydraulic or pneumatic power cylinder 5 which, in the present example, advantageously comprises a single-acting cylinder with a piston rod 6 movable in respect to the cylinder 5. Operating fluid is supplied to cylinder 5 through a line 7, shown in FIG. 1.

In the considered embodiment, telescopic post 1 comprises three telescoping parts, namely, a lower part 8, a middle part 9, and an upper part 10. They all have channel-shaped cross-sections, as may be learned particularly from FIG. 2. The portion of middle part 9 which, with the post extended, remains within lower part 8, is equipped with rollers 11, 12 for lengthwise and crosswise bracing, preferably comprising ball bearings. Similarly, and for the same purpose of lengthwise and crosswise bracing, rollers 13 and 14 are provided at the upper and lower ends of upper part 10 which is movable within the middle part. Middle part 9 is connected to the piston rod 6. In addition, middle part 9 is connected to one end of a chain 16 which is passed over a sprocket wheel 15 mounted for rotation on the upper end portion of middle part 9. The other end of the chain is secured to the lower end of lower part 8.

Figure 3:
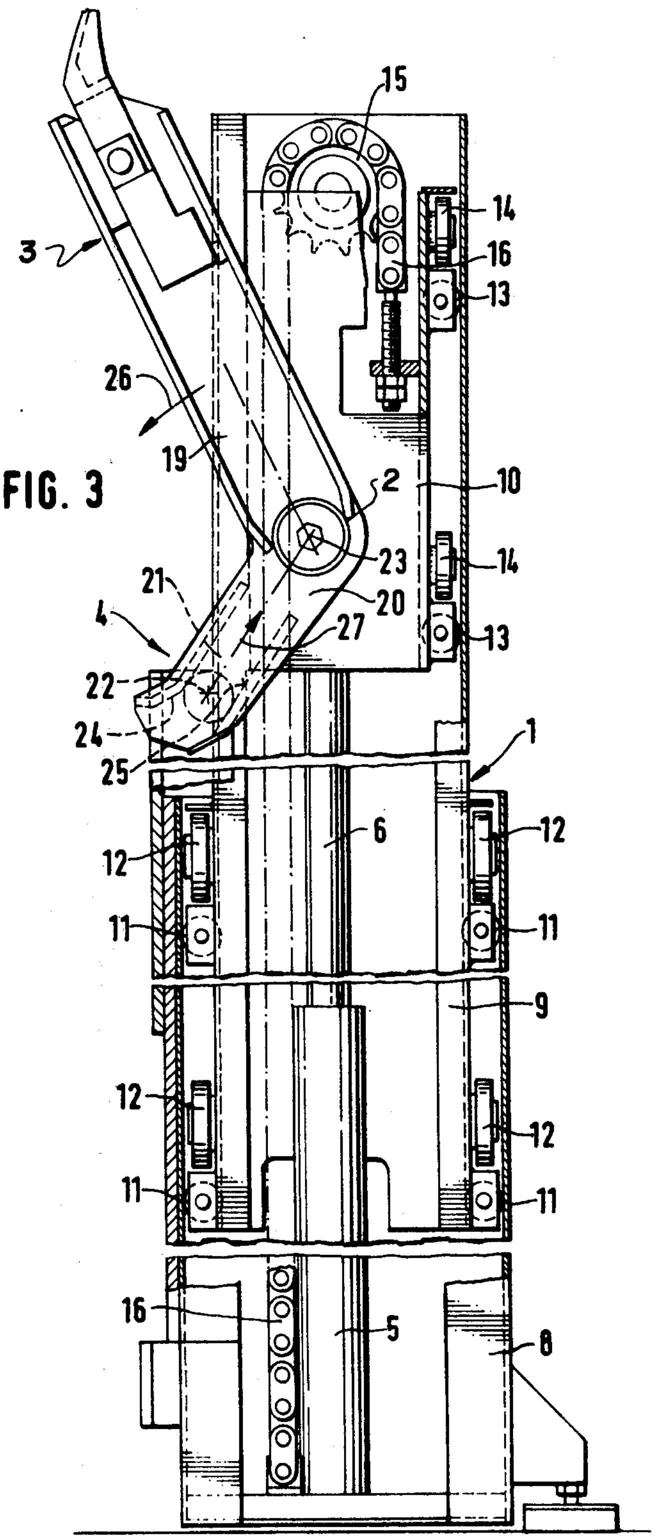
FIG. 3 is a sectional view taken substantially along the line III—III of FIG. 2.

As already mentioned, support 3 is pivotable about horizontal shaft 2 which is secured to the uppermost part, i.e., upper part 10 of telescopic post 1 and extends perpendicularly to the lifting motion of the post, i.e., in the horizontal direction. Support 3 has the form of the letter U, the middle portion or web 3*a* of which embraces shaft 2 conectrically and is designed as a bearing sleeve. Two U-leg portions 18 and 19 of the support 3 are equipped, at their free ends, with coupling and locking mechanisms 52 and 54, respectively, for securely and non-rotatably holding a container (FIG. 3). Thus, the container can be tilted about horizontal shaft 2 only along with support 3. This tilting motion is automatically controlled and takes place during the end phase of the lifting motion.

Figure 2:
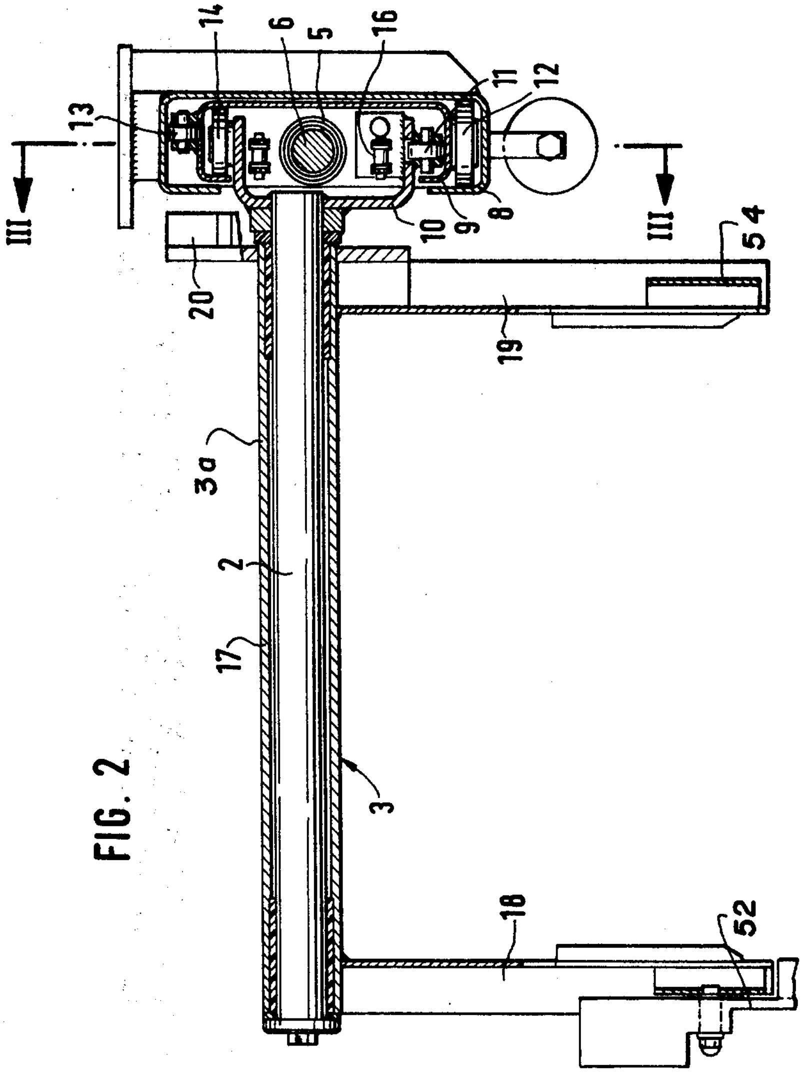
FIG. 2 is a sectional view taken along the line II—II of FIG. 1.

For tilting the legs 18 and 19, the U-leg 19 adjacent post 1, which, in the same manner as the other U-leg 18, in the lowered position of telescopic post 1, extends horizontally, is provided with a control extension 20, FIGS. 2 and 3, comprising a guide groove 21. Guide groove 21 cooperates with a guide member 22 which is designed as a pin and mounted, in the present example, in the upper half of middle part 9 of the post. FIG. 3 shows particularly clearly that U-leg 19 and the central longitudinal axis of guide groove 21 form an obtuse angle, preferably of about 120°. The central longitudinal axis of the groove passes through the pivotal axis 23 of the support 3. In the lowered position of telescopic post 1 and support 3, the open or gate end 24 of groove 21, which is provided with an oblique lead-in face, points upwardly. The arrangement is such that as upper part 10 of the post is lifted, guide groove 21 engages from below over guide member 22. Since the distance between the gate end 24 and shaft 2 of support 3 is greater than the perpendicular distance between guide member 22 and piston rod 6 and the longitudinal axis of guide groove 21 extends obliquely relative to the longitudinal axis of piston rod 6, with the continuing lifting motion, upper part 10 of the post presses guide member 22 against the inner wall 25 of guide groove 21. It is to be noted that at that time, considering FIG. 3, U-leg 19 extends horizontally and projects to the righthand side beyond telescopic post 1.

It will be easily understood that after "coupling" guide member 22 to guide groove 21, a lifting motion of telescopic post 1 results in a pivotal motion of support 3 in the direction of arrow 26. FIG. 3 shows support 3 in the end position thereof, after a pivoting through about 120°. As already mentioned, the container (not shown) follows this tilting motion so that in the end position, the filling opening of the container is directed obliquely downwardly so that the contents are discharged into the processing machine or the filling funnel thereof (both not shown). During this pivotal or tilting motion of support 3, guide member 22 first moves in the direction of arrow 27 in groove 21, whereupon, in the second phase of the pivotal motion, the travel of guide member 22 is reversed, so that at the end of the motion, the guide member again occupies its position at the gate end of guide groove 21, as shown in FIG. 3. The pivoting back of support 3 and lowering of telescopic post 1 is effected in the reverse order, provided a double-acting lifting cylinder 5 is used and pressurized from the opposite side.

In the present example, however, as already mentioned, a single-acting cylinder 5 is provided. This means that a particular return mechanism is needed for pivoting support 3 back, beyond the dead center position. The dead center position once passed, the support and parts 9 and 10 of telescopic post 1 return automatically into their initial positions under their own weight, as soon as hydraulic or pneumatic cylinder 5 is depressurized and the operating fluid can escape.

Figure 4:
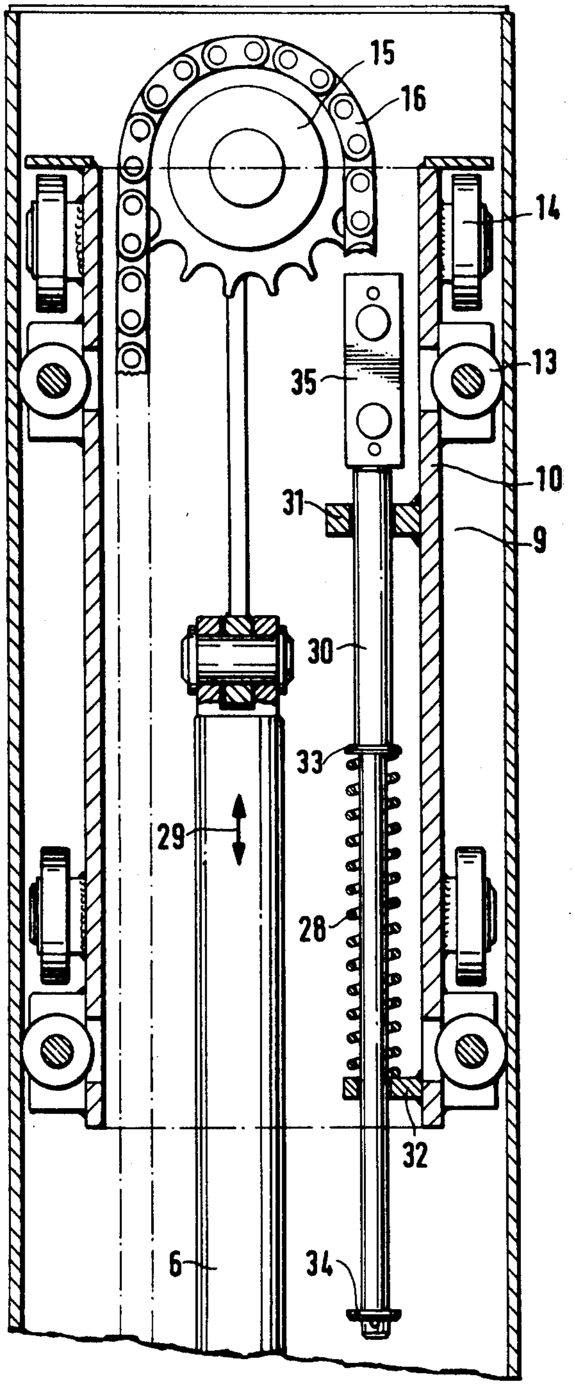
FIG. 4 is a sectional view taken along the line IV—IV of FIG. 1.

Such a mechanism for returning support 3 with the container into their initial positions is shown in FIG. 4. The necessary return force is produced by a return spring 28 which is tensioned during the pivotal motion for emptying. The design is as follows: On the upper part 10 of telescopic post 1, an abutting member 30 is mounted for moving upwardly and downwardly in the telescoping directions of arrow 29. For this purpose, two lugs 31 and 32 spaced from each other are provided. Return spring 28 which is designed as a helical compression spring and concentrically surrounds abutting member 30 rests, by its lower end, against the lower lug 32. The upper end of the spring is applied against a collar 33 of abutting member 30. An annular disc secured in a manner known per se may also be used instead of the collar. The spring is biased, so that a collar or disc 34 provided at the lower end of abutting member 30 is pressed against the underside of lug 32.

At the upper end of middle part 9 of post 1, a stop 35 is provided against which the upper end of member 30 abuts before support 3 reaches a 90° tilting position. With the continuing lifting motion of upper part 10 of the post, lug 32 is pushed against the lower end of return spring 28 thereby compressing the spring. The force thus accumulated is sufficient even for pivoting the full container from its emptying position back beyond a dead center position. This may be necessary if, for some reason, the material to be processed sticks to the container and the container must be lowered once again.

While a specific embodiment of the invention has been shown and described in detail to illustrate the application of the principles of the invention, it will be understood that the invention may be embodied otherwise without departing from such principles.

What is claimed is:

1. A lifting device for feeding a processing machine, particularly for the food industry, comprising a telescopic post including at least one bottom part and one upper part movable telescopically upwardly and downwardly in respect to said bottom part, a container support having at least one bottom support member adapted to extend generally horizontally to support a container when in a support position, means pivotally supporting said support on said telescopic post permitting the pivoting of said support to a support position with said bottom support member disposed horizontally and to a discharge position with said bottom support member disposed at a tilting angle in respect to the horizontal for the discharge of the container thereoff, cam means defined between said support and said post for causing the pivoting of said support during the telescopic movement of said at least one bottom part and said at least one upper part so as to shift said support between said support position and said discharge position which is beyond a dead center position of said support and means for moving said at least one upper part relative to said at least one bottom part, said cam means including an extension part on said support having a groove therein, and a guide member carried by said post engageable with said groove during the telescopic movement of said at least one upper part relative to said at least one bottom part, said groove extending at an angle obliquely relative to said bottom support member of said support, said angle being from 90° to 120°, return spring means disposed in the path of movement of said support so as to be contacted by said support when said support moves beyond said dead center position and to become tensioned by further movement of said support for returning said support to a returned position after said means for raising said one upper part relative to said one bottom part becomes no longer effective and a bolt extending through said spring, said spring comprising a helical compression spring concentrically surrounding said bolt and resting at its lower end against the upper part, said bolt having a collar engaged against the opposite end of said spring.

2. A lifting device, according to claim 1, wherein said container support comprises a U-shaped member having a web part which is pivotally mounted on said post and having first and second spaced apart leg portions forming said bottom support member.

3. A lifting device, according to claim 1, including a pivot shaft mounted on said at least one upper part and comprising said means pivotally supporting said support.

4. A lifting device, according to claim 1, wherein the axis of said groove passes through the pivotal axis of said pivotal supporting means.

5. A lifting device for feeding a processing machine, particularly for the food industry, comprising a telescopic post including a lower part, a middle part telescopic in respect to said lower part and an upper part telescopic in respect to said middle and lower parts, said middle and upper parts being extensible out of said lower part, and said upper part being extensible out of said middle part in a raised position, a support having at least one bottom leg member adapted to extend generally horizontally to support a material in a support position, means pivotally supporting said support on said upper part, said support having a control portion, a control member on said middle part engageable with said control portion in a position so that upon telescopic movement of said upper part relative to said middle part, said support member is pivoted from a position in which said bottom support leg is substantially horizontal to a position in which said bottom support leg is inclined in respect to the horizontal, and means for shifting said middle part and said upper part relative to said bottom part to telescopically extend and to telescopically retract said parts and to shift said bottom support leg from a horizontal support position to a tilted discharge position, said means pivotally supporting said support on said upper part including a pivot shaft, said support having a central sleeve portion, said bottom support leg including at least two spaced apart legs connected to said sleeve portion at spaced locations thereon, said control member comprising an arm portion extending at an angle to said leg portions and having a groove thereon, said middle portion having a control member engaged in said groove, said supporting leg being shiftable from a horizontal position past a 90° position to the horizontal and back over the said 90° position to a final discharge position, a compression spring mounted adjacent said support, said support having a portion engageable with said compression spring to compress said spring when said support legs are moved beyond a 90° position, said spring acting to return said support to an original position back beyond a 90° position once again when said means to lift said top part and middle part relative to said lower part is no longer effective, and a bolt extending through said spring, said spring comprising a helical compression spring concentrically surrounding said bolt and resting at its lower end against the uppermost telescopic part, said bolt having a collar engaged against the opposite end of said spring.

6. A lifting device, according to claim 5, including a sprocket contained on said upper part, a chain secured to said lower part and extending over said sprocket and secured to said upper part.

7. A lifting device, according to claim 5, wherein said means for moving said upper part and said middle part relative to said lower part includes a piston and cylinder combination disposed within said lower part, said piston having a piston rod connectable to said upper part.

* * * * *